United States Patent [19]
Gasper

[11] 3,953,213
[45] Apr. 27, 1976

[54] PISTON CONSTRUCTION FOR FLUID POWER CYLINDERS

[75] Inventor: Ralph L. Gasper, Lansing, Ill.

[73] Assignee: Bimba Manufacturing Company, Monee, Ill.

[22] Filed: Apr. 5, 1974

[21] Appl. No.: 458,083

[52] U.S. Cl. .................................. 92/184; 92/244; 277/63; 277/78
[51] Int. Cl.² ........................................ F16J 9/08
[58] Field of Search ............. 92/240, 243, 182, 184, 92/244, 242, 250, 251, 185, 128; 277/63, 205, 78, 79

[56] References Cited
UNITED STATES PATENTS

| | | | |
|---|---|---|---|
| 1,448,624 | 3/1923 | Gordon | 92/240 |
| 1,796,415 | 3/1931 | Tyler | 277/63 X |
| 2,686,402 | 8/1954 | Samuel | 277/205 X |
| 2,819,131 | 1/1958 | Lankford | 92/251 |
| 2,878,085 | 3/1959 | Barnhart | 277/205 |
| 2,962,330 | 11/1960 | Kohl | 92/244 |
| 3,334,549 | 8/1967 | Sheldon | 277/63 X |
| 3,540,745 | 11/1970 | Flock | 277/63 X |

FOREIGN PATENTS OR APPLICATIONS

| | | | |
|---|---|---|---|
| 736,283 | 9/1955 | United Kingdom | 277/63 |
| 1,109,763 | 4/1968 | United Kingdom | 92/249 |

*Primary Examiner*—Irwin C. Cohen
*Attorney, Agent, or Firm*—Philip T. Liggett

[57] ABSTRACT

In order to preclude the entrapment of low pressure fluid in the interior of U-form seal members in the peripheral grooves of a piston for a fluid power cylinder and in turn prevent the inward deflection of such seals, there are provided cuts or notches in the edges of the end portions of the piston member to effect the venting of the inside of the seal members. Preferably opposing flat chord-like cuts are made in the end portions of the piston down to a mid part of the peripheral groove such that the resulting flat sections can be used to fit into wrench or vise means for piston rod assembly purposes.

3 Claims, 3 Drawing Figures

Figure 1
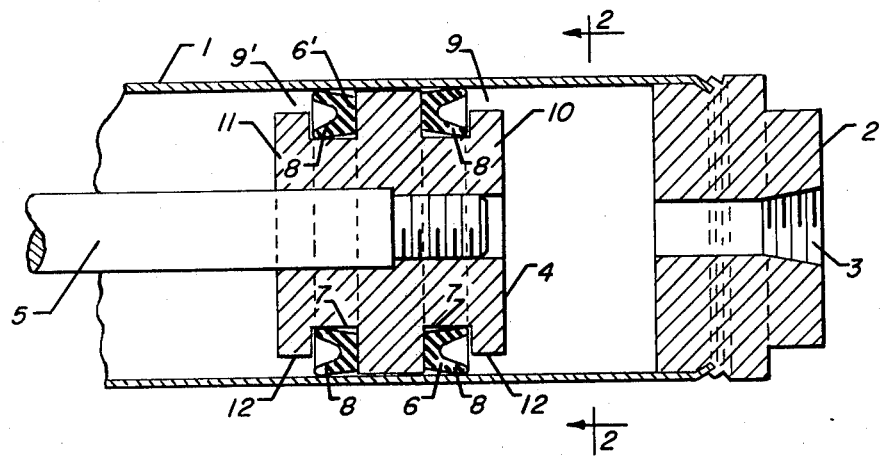
Figure 2
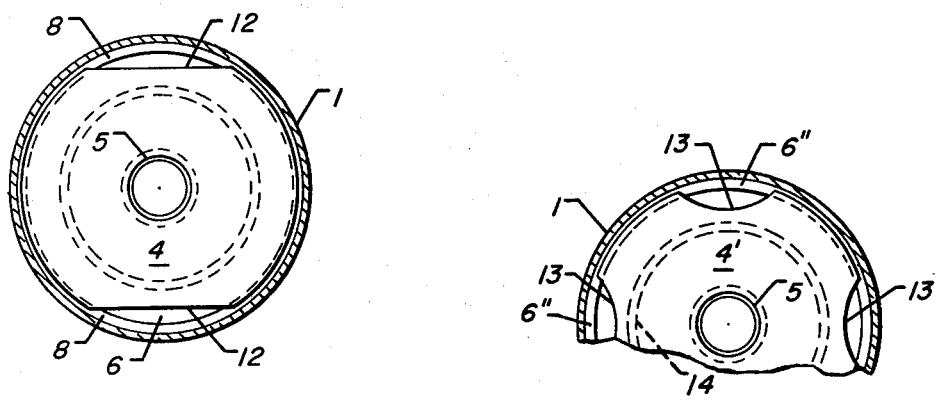
Figure 3

PISTON CONSTRUCTION FOR FLUID POWER CYLINDERS

The present invention is directed to an improved design and construction for the piston member of a fluid power cylinder in order to prevent the entrapment of low pressure air, or other fluid medium, in the interior of U-form seal members which are used in the peripheral grooves of the piston.

More particularly, the invention covers the provision of notch means in the periphery of the end portions of the piston member of a fluid power cylinder such that air or other fluid can be vented from the interior cavity that a U-form seal member can make with the piston groove wall to prevent any holding of low pressure air.

BACKGROUND OF THE INVENTION

In connection with air cylinders or other forms of fluid power motors, it is quite conventional to utilize rubber or composition seal rings which have a U-form or U-cup configuration and are adapted to be placed in peripheral grooves extending around the circumference of the piston member. The U-shaped seal rings are positioned within their respective grooves such that one side or one lip of the U will move back and forth against the inside wall of the cylinder while the other side rests in the bottom portion of a peripheral groove. This type of seal, as well as with most types of seal rings, is never completely leakproof in that a small amount of air, or pressurizing fluid medium, can pass around the seals such that the zone between the seals and around the central portion of the piston can be pressurized to some extent. Under most operating conditions, this trapped pressure will be released by a slight deflection of a seal lip away from the inside of the cylinder bore to allow excessive pressure to escape. However, under certain dynamic conditions of cylinder operation, the seal lips can be compressed by the escaping pressure to a point where they contact a groove side wall in the piston member and thus form a closed chamber between the lips of the U-form seal member and the contacts of the ends of the lips with the groove wall. Thus, when the exhausted or low pressure end of the cylinder is rapidly repressurized, there will exist sufficient pressure differential between the low pressure air trapped in the interior of the seal and the high pressure air surrounding the ends of the piston member to compress the outer lip of the seal. This force in turn can be sufficient to maintain the seal ring lips in a compressed, deflected position and thus allow free passage of air past the seal ring and the piston member itself. Also, inasmuch as a U-cup type of seal is positioned in a piston groove in a manner to be unidirectional in action, a second piston seal on the other end of the piston member will readily pass air from the high pressure side of the piston to the low pressure side thereof and allow both chambers of the air cylinder to reach the same pressure. Actually, under this equal pressure condition the piston will stall within the cylinder and cannot produce a force on the piston rod.

The aforedescribed problem with respect to the periodic failure of U-cup seal rings in piston members for fluid power motors is generally known to the industry and various methods of trying to overcome the problem have been carried out. Typically, there are two basic methods of preventing this type of seal failure. In connection with one method of correction, there are mechanical support means that can be placed between the lips of the U-form seal member and against the side of a piston groove such that the seal lips, even though deformed by peripheral fluid pressure, cannot contact the piston groove wall to form a closed chamber.

With respect to another method of preventing seal failure, there has been means provided to vent the interior space between the lips of the seal member such that there will always be an equilization of pressures between the interior of the cylinder and the interior space between the lips of the seal rings in order to allow the lips thereof to spring back into proper contact with the cylinder wall. In some instances, there have been small holes drilled through the ends of the piston to reach the side wall portion of the groove for the seal member such that there is a venting provided for the interior zone between the lips of the seal member and the resulting prevention of a trapped low pressure zone. However, the drilling of holes through a piston member is a costly manufacturing operation and in addition will leave burrs on the inside of the groove which are difficult to remove. Any remaining burrs on the inside wall of a piston groove will interfere with the action of the seal member and, additionally, can cut the ends of the lips and cause excessive rapid wear. In another arrangement, there has been the provision of a smaller diameter end portion for the piston such that there is no circumferential wall portion for an outer lip of a seal member to become sealed against and thus provide for the trapping of low pressure air. However, in connection with this type of construction, it has been found that the friction or drag of a seal lip against the inside of the cylinder wall can totally dislodge a seal ring from the piston groove to in turn result in the total loss of cylinder operation.

In view of the problems of obtaining a suitable vent arrangement for seal members in the grooves of a piston member, it is a principal object of the present invention to provide a simplified design and construction which provides at least one notch means on each of the peripheral end portions of a power cylinder piston member, with such notch means being to a depth that a U-cup seal can be vented between the lip portions thereof and prevented from remaining in a compressed or collapsed condition with the ends of the lip members being held tightly against the wall of the piston groove.

In one embodiment, the present invention provides in connection with a fluid power cylinder having a movable piston with peripheral grooves for U-form seal members to effect a seal with the cylinder wall, the improved construction to prevent low pressure fluid from being trapped in a hollow between the lips of the U-seal member which comprises, providing a notch means in the peripheral end portions of the piston member to a depth reaching a mid portion of the seal holding grooves whereby to insure the venting of the interior portions of the seal members held within the piston grooves.

Actually, various shapes may be provided for the notch means at the edge of a piston member; however, in order to insure rapid and adequate venting of the interior of a U-form seal member within a groove, there may be opposing notch means on an end portion of the piston member such that venting can actually take place from two zones for the space between the lips of a seal member.

Still further, for purposes of manufacture and for the assembly of piston members with piston rod members, it has been found to be of particular advantage to have the notch means milled or broached as flats across the end portions of the piston. In other words, milled or broached flats will be diametrically opposite of each other and will form two chord-like cuts from the peripheral end portions of the piston member, with each cut being carried back into a piston seal groove such that there will be venting from the interior of the groove and from the chamber normally formed between the lips of the seal and the wall of the piston groove. By providing two opposing chord-like flat sections, there are resulting flats which can be used as clamping surfaces for a wrench or for vise gripping means. During the manufacture of the flat notches, any burrs that may be produced in forming the flats will be on an exposed accessible edge and thus easily removed in a rapid assembly line procedure or by a tumbling operation. The flat cuts will extend from the outer circumference or periphery of the piston to a depth sufficient to reach a mid portion of the groove wall and thus permit adequate venting from the space between the lips of the seal member; however, the remainder of the groove wall will be of full depth from the outer periphery of the piston to the small diameter, bottom portion of the peripheral seal holding groove.

Reference to the accompanying drawing and the following description thereof will serve to illustrate the improved simplified means for venting U-cup types of seals for piston members and in addition serve to set forth operational advantages obtained from the modified construction.

FIG. 1 of the drawing is a partial longitudinal sectional view of a fluid power motor unit, indicating notch means in the end portions of the piston member so as to provide venting into the interior portions of the U-form piston seal rings.

FIG. 2 of the drawing is a cross-sectional view, as indicated by the line 2—2 in FIG. 1, showing the end of the piston member with chord-like cuts across the end portion thereof to form notching into the seal groove.

FIG. 3 of the drawing shows, in a partial cross-sectional view, a modified notching design arrangement for the end portions of the piston member in order to provide the desired venting to the interior portion of the seal rings.

Referring now particularly to FIGS. 1 and 2 of the drawing, there is indicated a fluid motor assembly, such as an air operated cylinder, which has a cylindrical body portion 1 with an end closure member 2 in turn have a fluid port means 3 communicating with the one interior end portion of the cylinder. The interior of the cylinder is provided with a piston member 4 in turn connecting to piston rod means 5 which will pass through the other end of the cylinder, not being shown. As is customary with air cylinders and other types of fluid motor units, the piston member is provided with spaced circumferential U-form seal members, such as 6 and 6', within spaced grooves 7, so as to minimize leakage around the piston member and effect a pressure seal between the spaced end compartments within the body of the cylinder 1.

Typically, the piston seal ring members will be of a synthetic rubber or elastomer, such as of Buta-n rubber or Viton rubber, and the like, with suitable materials having the resilient or elastic ability to cause the particular piston ring configuration maintain a circumferential engagement along the inside wall of the cylinder 1 as the piston moves back and forth within the cylinder. The U-cup, or U-form design, is of advantage in having resilient lip members, such as 8, on each ring member which will have the ability to provide a spring-like contact with the wall of the encompassing cylinder. It is also to be noted that the piston ring members 6 and 6' are positioned in an opposite hand manner such that the action of one is opposite the other with respect to maintaining contact with the inside of the cylinder wall 1. In other words, as the piston member moves toward end member 2, the outer lip member 8 of seal ring 6 will be pushing against the inside wall of the cylinder while the outer lip member 8 of the other piston ring member 6' will be, in effect, dragged over the inside surface of the cylinder wall and, conversely, as the piston moves in the opposite direction, the reverse action will take place with respect to the lip members 8.

In any event, in accordance with the present invention, the present piston design is provided with notches or cut-out portions for each of the end portions of the piston member 4 at zones 9 and 9' by virtue of having external peripheral portions of the end wall portions 10 and 11 cut to provide the resulting flat surfaces at 12. Also, as best shown in FIG. 2 of the drawing, the positioning of surfaces 12 are the result of cutting down through the wall portions 10 and 11 to provide venting into the interior cup-like portions of seal rings 6 and 6' so as to preclude an outer lip member 8 from sealing against an inside groove wall and maintaining a low pressure trapped air zone within the cup portion of the piston seal ring. The actual depth of the cuts to provide surfaces 12 and the open spaces 9 or 9', as shown in FIG. 1, will, of course, vary to suit the depth of the groove means 7 and the actual size of configuration of the resilient U-cup seal ring members 6 and 6'. In other words, in each case, the cut to form the chord-like surfaces 12 and the venting through the end portions of the piston member 4 to reach the interior of the groove means 7 and the interior space between the inner and outer lips 8 of the particular seal members will depend upon the size and configuration of the ring seal members 6 and 6'.

As heretofore pointed out, it has been found undesirable and impractical to have a full circumferential cutting of the end portions of the piston member and of an entire wall portion, such as 10, so as to provide for the venting of the piston ring members because the latter can become dislodged or jammed within the cylinder. It is, therefore, preferable to have the notching means, as indicated at 9 and 9' in FIG. 1, to have no greater extent than to satisfactorily provide for air or fluid venting from the interior of the seal members.

In theory and practice, a single notch at each end of the piston member 4 is sufficient to provide adequate venting to the interior portion of a U-cup seal member and preclude the entrapment of low pressure air or other fluid within the seal member. However, it has been found that there is a practical advantage to having two notches or cut-outs, such as provided in FIG. 2 of the drawing, where there are two diametrically opposing chord-like cuts to provide straight flat surfaces 12 across the end portions of the piston member 4. In other words, the opposing "flats" 12 provide advantageous engagement surfaces for a wrench or for the mounting of the piston member in a bench vise, aa holding jig, or whatever, such that the piston member may be readily held during the assembly of the piston rod member 5 or for other manufacturing or repair purposes. The flat surfaces 12 may also be readily produced in a broaching or milling operation which may be carried out as a relatively rapid manufacturing step.

It is, however, not intended to limit the present invention to flat chord-like notching inasmuch as other forms of notches may well be provided at one or more zones on each end portion for the piston member 4. With particular reference to FIG. 3 of the drawing, there is indicated a modified notching arrangement where a plurality of arcuate form notches 13 are provided around the peripheral portion of a piston member 4' in order to cut into the end walls forming the seal ring grooves having inside radius 14. Again, the extent of the cut or the size of the notches 13 will be such as to reach a mid portion of the depth of the groove 14 and thus insure the venting of an interior portion of the seal ring means 6'' being maintained within the grooves of the piston member 4'. Still other forms of notching will be obvious to those skilled in the manufacturing procedures for fluid power cylinders. It is, however, desirable that the design or configuration of a particular notch is such that the flat or curved edge portion thereof will be readily accessible and can be easily deburred and smoothed. In other words, as will be noted from both FIGS. 2 and 3 of the drawing, both the interior and external edges of the surfaces 12 and 13 are far more accessible for filing or sanding and for the rapid removal of any burrs that may be caused from a milling or broaching operation, or even from the use of a large diameter drill in effecting a notch such as 13, particularly as compared to the problem of removing burrs and roughness from the inside of a vertical groove wall resulting from small drilled holes as heretofore set forth as one of the earlier tried means for effecting venting into the inside of a groove and seal ring. The large external edges which are readily accessible for manual burr removal are also more readily accessible to deburring means from tumbling operations, where fine shot or other tumbling material need be utilized to effect the desired deburring step. In connection with small drilled holes terminating within an inside wall of a piston groove, it is necessary to use fine shot or grit which will enter into a groove in order to attempt the deburring operation; however, in most instances, such operations have performed rather unsatisfactorily.

In FIG. 3 of the drawing, there has been indicated a placement of notch means 13 having an arcuate wall configuration; however, it is again reiterated that it is not intended to limit the present invention to any one size of notch or to any one particular pattern or to any predetermined number of notches. Typically, one notch will provide adequate venting to preclude the entrapment of air or other fluid in a seal member; however, for purposes of balance for the reciprocating piston member, it may be desirable to have opposing notches in a symmetrical pattern so as to result in the desired adequate venting as well as good operational balance to a fast moving reciprocating piston member.

I claim as my invention:

1. In a fluid power cylinder having a cylinder body portion, end closure members, fluid port means, a movable one-piece double-acting piston member and piston rod means, full depth peripheral annular grooves around said piston member that are spaced from the ends thereof to provide full diameter end portions and a center portion for said piston member, and laterally positioned U-form seal ring means in each groove with each seal ring means having an upper lip engaging said cylinder body portion and a lower lip engaging the bottom of the groove with the hollow of said U-form seal ring means facing an end portion and being entirely and directly open thereto, the improved construction to prevent low pressure fluid from being trapped in the hollow of the U-form seal means, which comprises, providing notch means in the outer periphery of each of the end portions of said piston member to a depth reaching a midportion of each groove and hollow of said U-form seal ring means and to form resulting lateral vent openings to the interior portion of each seal ring means being held within said grooves while leaving the remainder of the periphery of the ends of the piston member at a full diameter and the remainder of the grooves at full depth.

2. The fluid power cylinder of claim 1 further characterized in that said notch means comprise a plurality of notches that are provided within the outer periphery of the end portions of the piston member, with each notch being of the same size and configuration as the others in any one end portion, and such notches are positioned symmetrically around the end of the piston member to provide good balance for the operation thereof.

3. The fluid power cylinder of claim 1 further characterized in that said notch means comprise at least a pair of notch means provided from flat chord-like cuts across the end portions of said piston member and such notch means are placed as two diametrically opposing cuts across such end portions of the piston member whereby there are resulting opposing flat surfaces on said piston member suitable for straight surface gripping means.

* * * * *